United States Patent [19]
Ozawa et al.

[11] Patent Number: 4,577,230
[45] Date of Patent: Mar. 18, 1986

[54] SOLID STATE IMAGING DEVICE

[75] Inventors: Naoki Ozawa, Kokubunji; Toshiyuki Akiyama, Kodaira; Shuusaku Nagahara, Hachioji; Iwao Takemoto, Tokyo, all of Japan

[73] Assignee: Hitachi, Ltd., Tokyo, Japan

[21] Appl. No.: 691,911

[22] Filed: Jan. 16, 1985

[30] Foreign Application Priority Data

Jan. 18, 1984 [JP] Japan ................................. 59-5576

[51] Int. Cl.4 .............................................. H04N 3/12
[52] U.S. Cl. ................................................... 358/212
[58] Field of Search ................ 358/212, 213, 163, 167, 358/209

[56] References Cited

U.S. PATENT DOCUMENTS

| | | | |
|---|---|---|---|
| 4,010,319 | 3/1977 | Levine | 358/213 |
| 4,067,046 | 1/1978 | Nakatani et al. | 358/167 |
| 4,240,116 | 12/1980 | Tomlinson, Jr. | 358/213 |
| 4,336,557 | 6/1982 | Koch | 358/213 |
| 4,510,528 | 4/1985 | Bergen | 358/213 |

Primary Examiner—Gene Z. Rubinson
Assistant Examiner—Stephen Brinich
Attorney, Agent, or Firm—Antonelli, Terry & Wands

[57] ABSTRACT

A solid state imaging device is disclosed in which photodiodes are arranged regularly in horizontal and vertical directions and generate signal charges in response to incident light, the signal charge thus obtained and smear charges stored on vertical signal lines are alternately and separately transferred to an output end by a horizontal charge transfer device, each of the smear charges is converted at the output end into a first voltage, the resultant charge of a signal charge following the above smear charge and another kind of smear charge is converted at the output end into a second voltage, a reset operation for the smear charge and resultant charge held at the output end is performed at an interval twice as long as the repetition period of a transfer pulse applied to the horizontal charge transfer device, and at least one of the first and second voltages is attenuated or amplified so that a difference between the first and second voltages thus processed provides an image signal in which any smear component is not present and reset noise is greatly reduced.

5 Claims, 12 Drawing Figures

SOLID STATE IMAGING DEVICE

BACKGROUND OF THE INVENTION

1. Field of the Invention

The present invention relates to a solid state imaging device, and more particularly to a solid state imaging device capable of reducing the vertical smear and reset noise caused by an imaging element which uses a charge transfer device as horizontal scanning means.

2. Description of the Prior Art

A solid state imaging element using a two-dimensional MOS type diode array or a two-dimensional charge coupled device has been put to practical use, with the advance of the semiconductor integration circuit technology. Further, it has been proposed to use a charge injection device in a solid state imaging element. In recent years, the present inventors have proposed an imaging element which includes an MOS type diode array and a one-dimensional charge transfer device in such a manner as shown in FIG. 1, in a Japanese patent application (Application No. 194685/1983), and have pointed out that the vertical smear can be reduced by using such an imaging element.

The operation of a solid state imaging device shown in FIG. 1 will be explained below in detail. The imaging device includes a photodiode array 6, a vertical shift register 1, an interlace circuit 3, a horizontal charge transfer device 10, and circuits 14 through 17 for reducing the vertical smear.

In operation, output pulses from the vertical shift register 1 are delivered successively on output lines $2_1$, $2_2$ ... and $2_m$, and are applied to the interlace circuit 3, which delivers output pulses to output lines $4_1$, $4_3$, ... and $4_{2m-1}$ to form an odd field sequentially, and delivers output pulses to output lines $4_2$, $4_4$, ... and $4_{2m}$ to form an even field sequentially. Thus, in a horizontal scanning period for obtaining the first horizontal scanning line of the odd field, vertical switching transistors $5_{1-1}$, $5_{1-2}$, ... and $5_{1-n}$ are simultaneously turned on, and signal charges generated in photodiodes $6_{1-1}$, $6_{1-2}$, ... and $6_{1-n}$ are transferred to vertical signal lines $7_1$, $7_2$, ... and $7_n$, respectively. Similarly, in a horizontal scanning period for obtaining the first horizontal scanning line of the even field, vertical switching transistors $5_{2-1}$, $5_{2-2}$, ... and $5_{2-n}$ are simultaneously turned on, and thus signal charges generated in photodiodes $6_{2-1}$, $6_{2-2}$, ... and $6_{2-n}$ are transferred to the vertical signal lines $7_1$, $7_2$, ... and $7_n$, respectively. Further, horizontal switching transistors $8_1$, $8_2$, ... and $8_n$ are simultaneously turned on by an ON signal applied to a control terminal 9, and thus the signal charges on the vertical signal lines $7_1$, $7_2$, ... and $7_n$ are transferred to the charge transfer device (hereinafter referred simply to as "CTD") 10, which acts as a horizontal shift register.

In the above imaging device, it is desirable that only the photodiodes $6_{1-1}$, ... and $6_{2m-n}$ are sensitive to light. In fact, however, the surroundings of each photodiode 6, for example, the drain of each vertical switching transistor 5 may be sensitive to light. The electric charge generated in the drain of each vertical switching transistor 5 is transferred to a corresponding one of the vertical signal lines $7_1$, $7_2$, ... and $7_n$, no matter whether the vertical switching transistor 5 is turned on or not. Hundreds of vertical switching transistors are arranged in a vertical direction, and the drains thereof are all connected to one vertical signal line. Accordingly, electric charges generated in these drains are accumulated on the vertical signal line. Further, the above electric charges are added to a signal charge which is generated in one of photodiodes connected to the above vertical switching transistors, at each horizontal scanning period. Thus, the so-called smear is generated. For example, when the image of an object having light portions such as shown in FIG. 2A is formed by the above-mentioned imaging device, each light portion appearing on the image is extended in a vertical direction, as shown in FIG. 2B.

The above-mentioned noise component peculiar to such an imaging device is called vertical smear. The amount of electric charge which causes the vertical smear, is proportional to a period that the electric charges generated in the drains of vertical switching transistors which are arranged in a vertical direction, are accumulated on one vertical signal line. That is, the amount of vertical smear charge which is transferred from the vertical signal line to the horizontal CTD 10 when the horizontal switching transistors $8_1$, $8_2$, ... and $8_n$ are turned on, is proportional to a time interval from a time these horizontal switching transistors were turned off, till a time the same transistors are turned on.

FIG. 3 shows a 3-phase electrode structure used in the horizontal CTD 10 of FIG. 1, and the internal potential corresponding to each electrode. In FIG. 3, the abscissa indicates a distance x. In parts (b) through (n) of FIG. 3, the ordinate indicates an internal potential $\phi_s$. Further, FIG. 4 is a time chart showing pulse signals applied to 3-phase electrodes.

When the horizontal CTD 10 has a 3-phase electrode structure such as shown in part (a) of FIG. 3, the potential well corresponding to each electrode takes such a state as shown in part (b) of FIG. 3.

When pulse signals shown in parts (a), (b) and (c) of FIG. 4 and having a frequency $f_c$ are applied to three electrode groups $H_1$, $H_2$ and $H_3$, respectively, the state of the potential well corresponding to each electrode is changed as shown in parts (c) through (n) of FIG. 3, in a period between $t_0$ and $t_{13}$. When those portions of the horizontal CTD 10 which correspond to the first electrode group $H_1$, are connected to the horizontal switching transistors $8_1$, $8_2$, ... and $8_n$ and these horizontal switching transistors are turned on in both a period between $t_0$ and $t_1$ and a period between $t_7$ and $t_8$, two charges $Q_A$ and $Q_B$ are separately taken in potential wells which are formed beneath the electrode groups $H_1$ and $H_2$, as shown in part (j) of FIG. 3. Thereafter, the charges $Q_A$ and $Q_B$ are separately transferred to the output side of the horizontal CTD 10, as shown in parts (k) through (n) of FIG. 3.

FIG. 5 is a time chart for explaining the charge transfer operation of the solid state imaging device shown in FIG. 1. Further, FIG. 6 shows an output voltage signal in the imaging device of FIG. 1 and sampling pulse signals used in the above imaging device.

As shown in FIG. 5, the horizontal switching transistors $8_1$, $8_2$, ... and $8_n$ are turned on in a period between $t_a$ and $t_b$, which is included in a horizontal blanking period. Thus, vertical smear charge $Q_{v1}$ which has been accumulated after a period between $t'_e$ and $t'_f$ (namely, an ON-period immediately before the present horizontal scanning period) and corresponds to the charge $Q_A$ of FIG. 3, is transferred to the horizontal CTD 10. The above operation in the period between $t_a$ and $t_b$ corresponds to that operation in the period between $t_1$ and $t_2$ which is shown in part (c) of FIG. 3. Thereafter, the vertical switching transistors $5_{i-1}$, $5_{i-2}$, ... and $5_{i-n}$ (where $i = 1, 2, ..., $ or $2m$) are turned on in a period between $t_c$ and $t_d$, to transfer signal charges $Q_S$ generated in the photodiodes $6_{i-1}$, $6_{i-2}$, ... and $6_{i-n}$ to the vertical signal lines $7_1$, $7_2$, ... and $7_n$. Then, the horizontal switching transistors $8_1$, $8_2$, ... and $8_n$ are again turned on in a period between $t_e$ and $t_f$ to transfer each signal charge $Q_S$ (corresponding to the charge $Q_B$ of FIG. 3) to the horizontal CTD 10. An operation in a period between $t_b$ and $t_e$ corresponds to those operations in a period between $t_2$ and $t_7$ which are shown in parts (d) to (h) of FIG. 3, and the operation in the period between $t_e$ and $t_f$ corresponds to that operation is a period between $t_7$ and $t_8$ which is shown in part (i) of FIG. 3. Further, when those operations in a period between $t_8$ and $t_{13}$ which are shown in parts (j) to (n) of FIG. 3, are repeated without turning on the horizontal switching transistors $8_1$, $8_2$, ... and $8_n$, the vertical smear charge $Q_{v1}$ and signal charge $Q_S$ can be separately transferred through the horizontal CTD 10.

But according to these operation the signal charge $Q_S$ is combined with vertical smear charge $Q_{v2}$ which is accumulated in a period between $t_b$ and $t_f$. Now, let us express a period between $t'_f$ and $t_b$ and the period between $t_b$ and $t_f$ by $T_1$ and $T_2$, respectively. Further, one horizontal scanning period is about 64 μs, and the horizontal blanking period is about 11 μs. Accordingly, the relation between the charge $Q_{v1}$ and the charge $Q_{v2}$ is given as follows:

$$Q_{v1} = \frac{T_1}{T_2} \cdot Q_{v2} \quad (1)$$

$$\approx 5 \cdot Q_{v2}$$

Owing to the above-mentioned operation, the vertical smear charge $Q_{v1}$ and the signal charge $Q_S$ combined with the vertical smear charge $Q_{v2}$ are alternately delivered from the output end of the horizontal CTD 10. The smear charge $Q_{v1}$ and the combined charge $Q_S + Q_{v2}$ are converted by the gate capacitance $C_G$ of a source followered transistor 11 into voltage signals $V_1$ and $V_2$, which appear on an output terminal 12. The voltage signals $V_1$ and $V_2$ are given by the following equations:

$$V_1 = \frac{Q_{v1}}{C_G} \quad (2)$$

$$V_2 = \frac{Q_S + Q_{v2}}{C_G} \quad (3)$$

A reset transistor 13 which is turned on by a reset pulse signal having the same frequency as a clock frequency $f_c$, is connected to the gate of the transistor 11, to sweep out the charge at the gate of the transistor 11 before the next charge is transferred from the horizontal CTD 10 to the above gate. A noise charge $Q_n$ is generated by the ON-OFF action of the reset transistor 13, and is held on the gate of the transistor 11 till the next ON-OFF action of the reset transistor 13. The noise charge is converted into a voltage, and appears on the output terminal 12 in the form of reset noise. As a result, final output voltages $V_1'$ and $V_2'$ appear alternately on the output terminal 12, are given by the following equations:

$$V_1' = \frac{Q_{v1} + Q_{n1}}{C_G} \quad (4)$$

$$V_2' = \frac{Q_S + Q_{v2} + Q_{n2}}{C_G} \quad (5)$$

Examples of the output voltages $V_1'$ and $V_2'$ are shown in FIG. 6. These output voltage $V_1'$ and $V_2'$ are alternately obtained at the output terminal 12 by applying the third electrode group $H_3$ with clock pulses, which have the repetition frequency $f_c$. The output voltages $V_1'$ and $V_2'$ thus obtained are separated from each other, by sampling circuits $14_1$ and $14_2$ which are shown in FIG. 1. Sampling pulse signals SP1 and SP2 which are shown in FIG. 6, are applied to the sampling circuits $14_1$ and $14_2$, respectively, and thus the circuits $14_1$ and $14_2$ take in the output voltage $V_1'$ and $V_2'$, respectively. The output voltage $V_1'$ extracted by the sampling circuit $14_1$ is attenuated by a gain control circuit 15 to a value equal to the product of a factor $T_2/T_1$ and the voltage $V_1'$, and then applied to a subtractor 16 together with the output voltage $V_2'$ which is extracted by the sampling circuit $14_2$. Accordingly, an output signal $V_{out}$ from the subtracter 16 is given by the following equation:

$$V_{out} = V_2' - \frac{T_2}{T_1} \cdot V_1' \quad (6)$$

$$= \frac{Q_S + Q_{v2} + Q_{n2}}{C_G} - \frac{T_2}{T_1} \cdot \frac{Q_{v1} + Q_{n1}}{C_G}$$

In the above equation (6), $Q_{v2}$ is equal to $(T_2/T_1)Q_{v1}$ according to equation (1). Therefore, the equation (6) is rewritten as follows:

$$V_{out} = \frac{1}{C_G} \cdot \left( Q_S + Q_{n2} - \frac{T_2}{T_1} Q_{n1} \right) \quad (7)$$

The output signal of the subtracter 16 is further applied to a low pass filter 17. As is evident from the equation (7), in the output of the filter 17, the vertical smear is extinguished, and the reset noise due to noise charge $Q_{n1}$ combined with the smear charge $Q_{v1}$ is reduced by a factor $T_2/T_1$. However, the reset noise due to noise charge $Q_{n2}$ combined with the signal charge $Q_S$ is left as it is. Since any correlation does not exist between the noise charges $Q_{n1}$ and $Q_{n2}$, the equation (7) can be rewritten as follows:

$$V_{out} = \frac{1}{C_G} \cdot \left( Q_S + \sqrt{\overline{Q_{n2}^2} + \left( \frac{T_2}{T_1} \cdot \overline{Q_{n1}} \right)^2} \right) \quad (7)'$$

SUMMARY OF THE INVENTION

An object of the present invention is to provide a solid state imaging device which can eliminate the vertical smear and can reduce the reset noise.

In order to attain the above object, according to the present invention, there is provided a solid state imaging device in which a smear charge and a signal charge are separated from each other by horizontal charge transfer means and alternately transferred to an output end, the smear charge is converted into a first voltage signal at the output end and then the smear charge is also combined with the next signal charge without being subjected to a reset operation, the combined charge is converted into a second voltage signal and then a reset operation is performed, that is, the reset operation is performed at an interval twice longer than the period of a driving pulse signal for the horizontal charge transfer means, in order for the first and second voltage signals to contain the same reset noise, one of the first and second voltage signals is attenuated or amplified, and one voltage signal thus processed and the other voltage signal are applied to a subtracter, to obtain an image signal in which the vertical smear is extinguished and the reset noise is greatly reduced, at the output side of the subtracter.

DESCRIPTION OF THE PREFERRED EMBODIMENTS

Now, the present invention will be explained below, on the basis of embodiments thereof.

Figure 8:
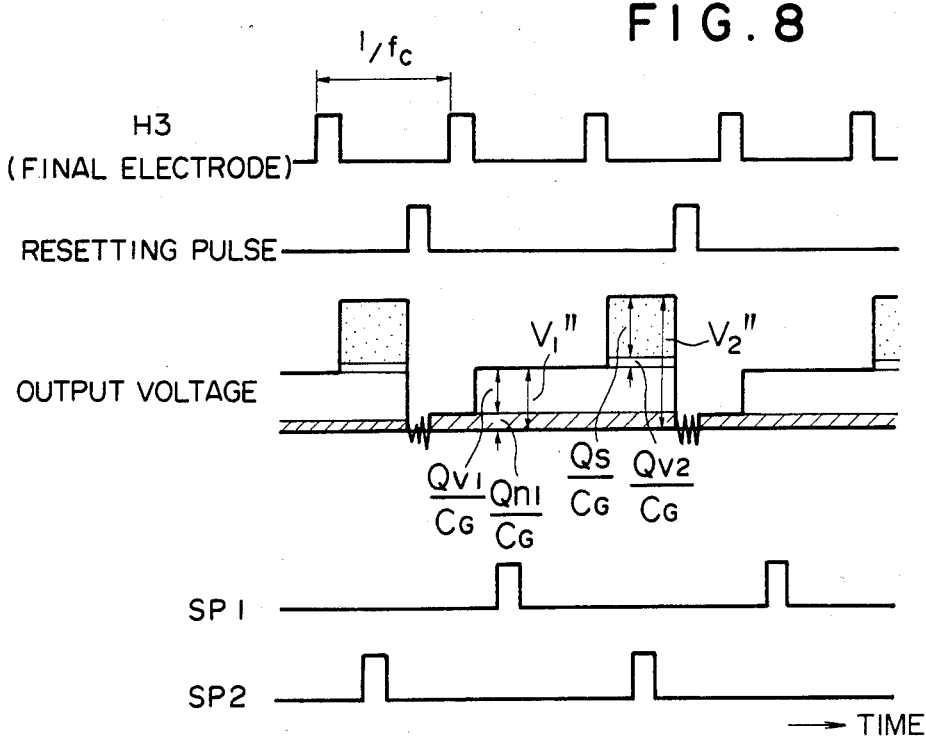
FIG. 8 shows an output voltage and sampling pulse signals in the embodiment of FIG. 7.
Figure 7:
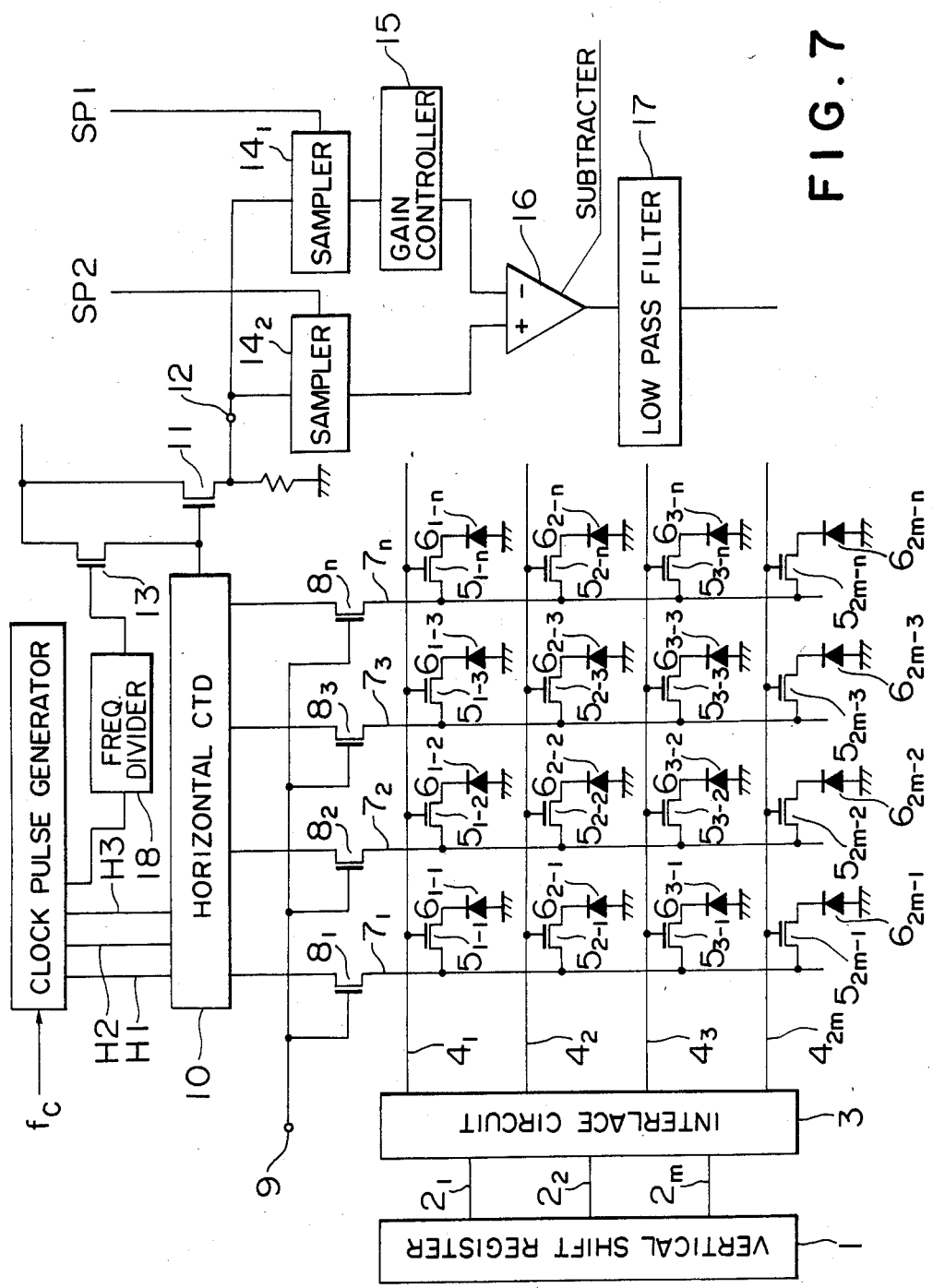
FIG. 7 is a schematic diagram showing an embodiment of a solid state imaging device according to the present invention.

FIG. 7 shows the circuit configuration of an embodiment of a solid state imaging device according to the present invention, and FIG. 8 shows the output processing in the embodiment of FIG. 7.

Figure 1:
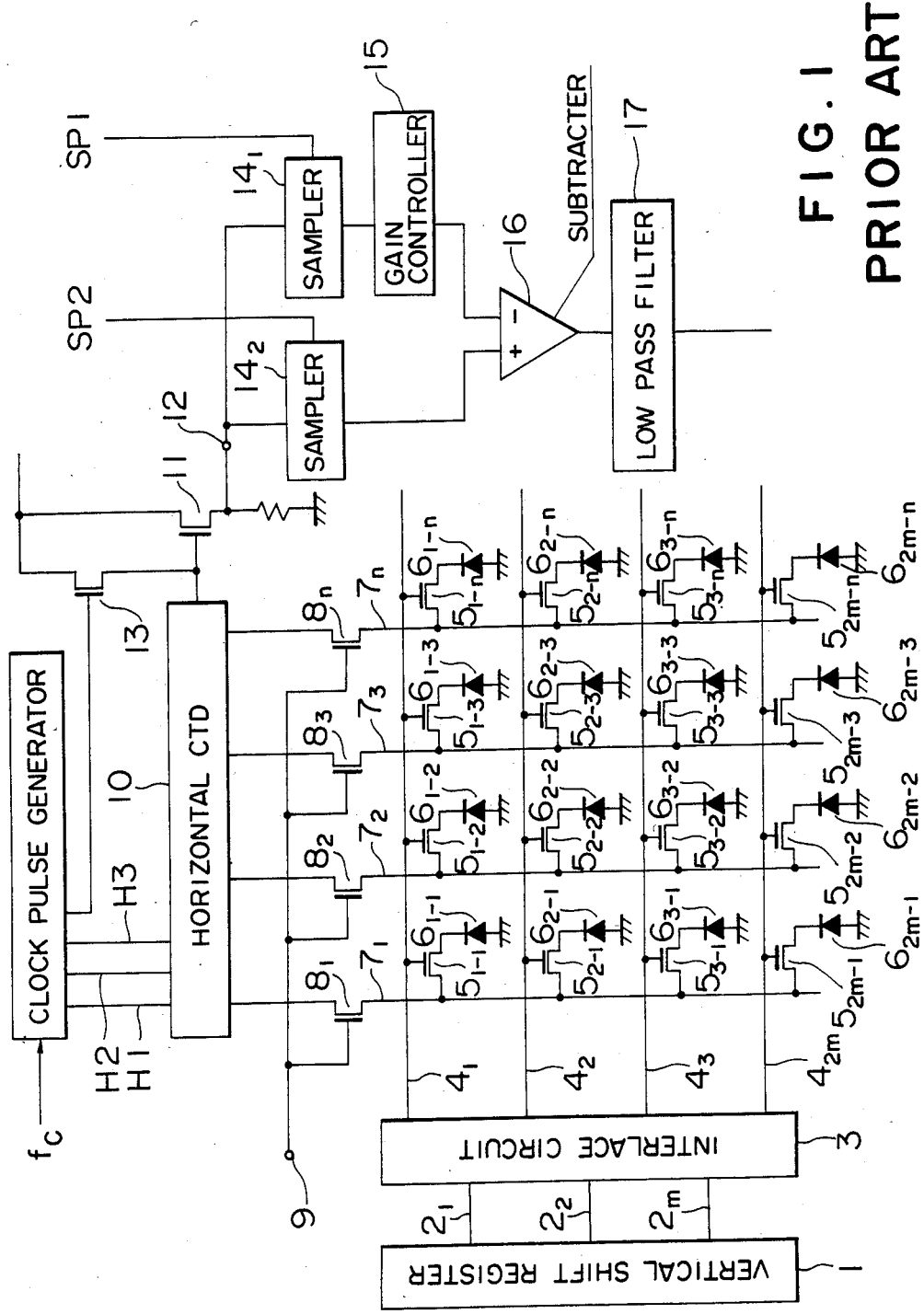
FIG. 1 is a schematic diagram showing a conventional solid state imaging device.
Figure 2A:
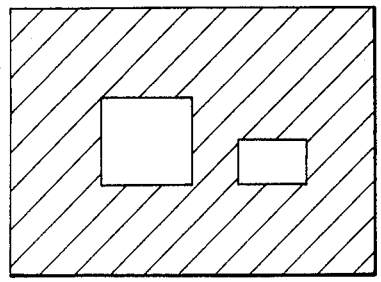
FIGS. 2A and 2B are schematic diagrams for explaining the vertical smear.
Figure 2B:
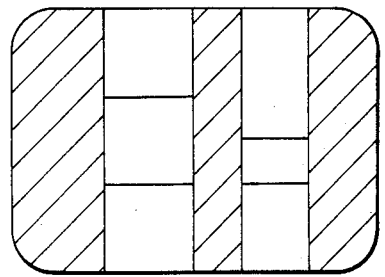

The embodiment of FIG. 7 is different from the conventional imaging device of FIG. 1, in that a frequency divider 18 is provided to make the frequency of a reset pulse signal which is applied to the reset transistor 13, equal to one-half the frequency of the clock signal applied to the horizontal CTD 10. That is, in the present embodiment, a reset operation for the source followered transistor 11 is performed at an interval corresponding to one-half the frequency of the clock signal applied to the horizontal CTD 10, to reduce both the vertical smear and the reset noise with the aid of a subtracter.

Figure 6:
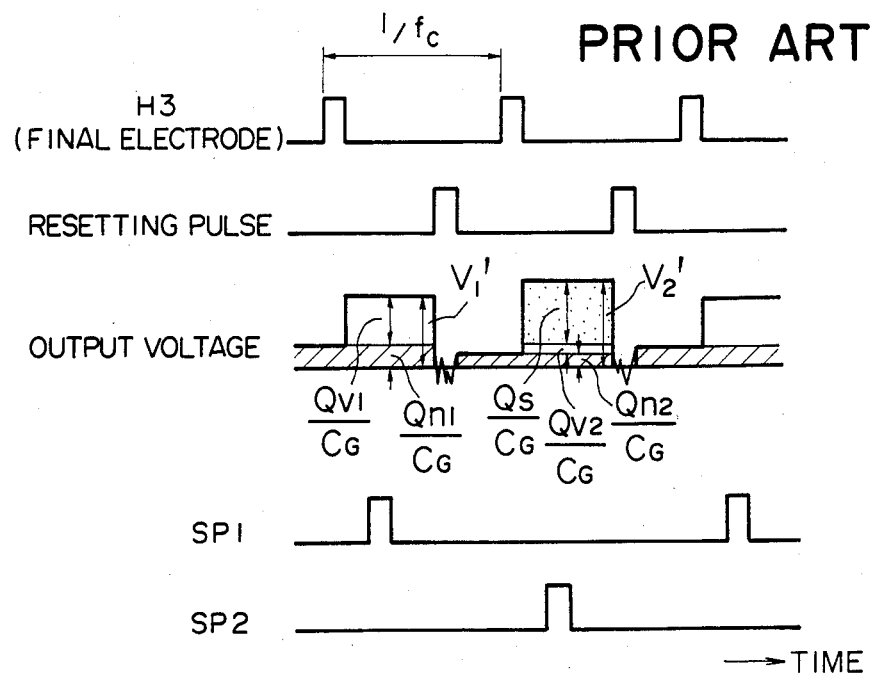
FIG. 6 shows an output voltage and sampling pulse signals in the imaging device of FIG. 1.

As is apparent from the comparison between FIG. 8 and FIG. 6, the resetting pulse used in the present embodiment is different from that used in the conventional imaging device of FIG. 1. In FIG. 6, the reset pulse signal has the same repetition frequency as the pulse signal applied to the final group of electrodes $H_3$. While, in FIG. 8, the reset pulse signal has a repetition frequency equal to one-half the frequency $f_c$ of the pulse signal applied to the electrode group $H_3$. In other words, in the present embodiment, a resetting pulse is applied to the reset transistor 13 in a period, in which two pulses are applied to the electrode group $H_3$.

In more detail, in the present embodiment, the phase of the reset pulse signal is determined as shown in FIG. 8, that is, the reset transistor 13 is turned on in a period which begins from a time the signal charge $Q_S$ combined with the vertical smear charge $Q_{V2}$ was outputted from the horizontal CTD 10, and is over at a time the vertical smear charge $Q_{V1}$ is outputted from the CTD 10. FIG. 8 also shows an example of the output signal appearing on the output terminal 12. Referring to FIG. 8, the reset transistor 13 performs an ON-OFF action on receiving a resetting pulse, and the noise charge $Q_{n1}$ due to the ON-OFF action is held by the gate of the transistor 11 for a period till the next ON-OFF action. In this period, the vertical smear charge $Q_{V1}$ is delivered from the horizontal CTD 10 by a pulse in the pulse signal applied to the electrode group $H_3$ and is superposed on the noise charge $Q_{n1}$. Further, the signal charge $Q_S$ combined with the vertical smear charge $Q_{V2}$ is delivered from the CTD 10 by the next pulse in the pulse signal applied to the electrode group $H_3$, and is superposed on the charges $Q_{n1}$ and $Q_{V1}$. That is, the reset noise is kept constant for a period when the reset transistor 13 is put in an OFF-state. Further, charges which are delivered from the horizontal CTD 10 in the above period, are added to each other, and then converted into a voltage signal.

Output voltages $V_1''$ and $V_2''$ are delivered from the sampling circuits $14_1$ and $14_2$ by applying the sampling pulse signals SP1 and SP2 to the circuits $14_1$ and $14_2$. The output voltages $V_1''$ and $V_2''$ are given by the following equations.

$$V_1'' = \frac{Q_{V1} + Q_{n1}}{C_G} \qquad (8)$$

$$V_2'' = \frac{Q_{V1} + Q_{n1}}{C_G} + \frac{Q_S + Q_{V2}}{C_G} \qquad (9)$$

The output voltage $V_1''$ extracted by the sampling circuit $14_1$ is amplified by the gain control circuit 15 to a value equal to the product of a factor $(T_1+T_2)/T_1$ and the voltage $V_1''$, and then applied to the subtracter 16 together with the output voltage $V_2''$ extracted by the sampling circuit $14_2$. An output signal $V'_{out}$ delivered from the subtracter 16 is expressed by the following equation:

$$V_{out}' = \frac{Q_{V1} + Q_{n1}}{C_G} + \frac{Q_S + Q_{V2}}{C_G} - \frac{T_1 + T_2}{T_1} \cdot \frac{Q_{V1} + Q_{n1}}{C_G} \qquad (10)$$

By substituting the equation (1) into the equation (10), the output voltage $V_{out}'$ can be rewritten as follows:

$$V_{out} = \frac{1}{C_G} \cdot \left( Q_S - \frac{T_2}{T_1} \cdot Q_{n1} \right) \quad (11)$$

The output of the subtracter 16 is further applied to the low-pass filter 17. Accordingly, in the output of the filter 17, the vertical smear component is extinguished, and moreover the reset noise is reduced to the product of a factor $T_2/T_1$ and a noise voltage $Q_{n1}/C_G$.

Figure 9:
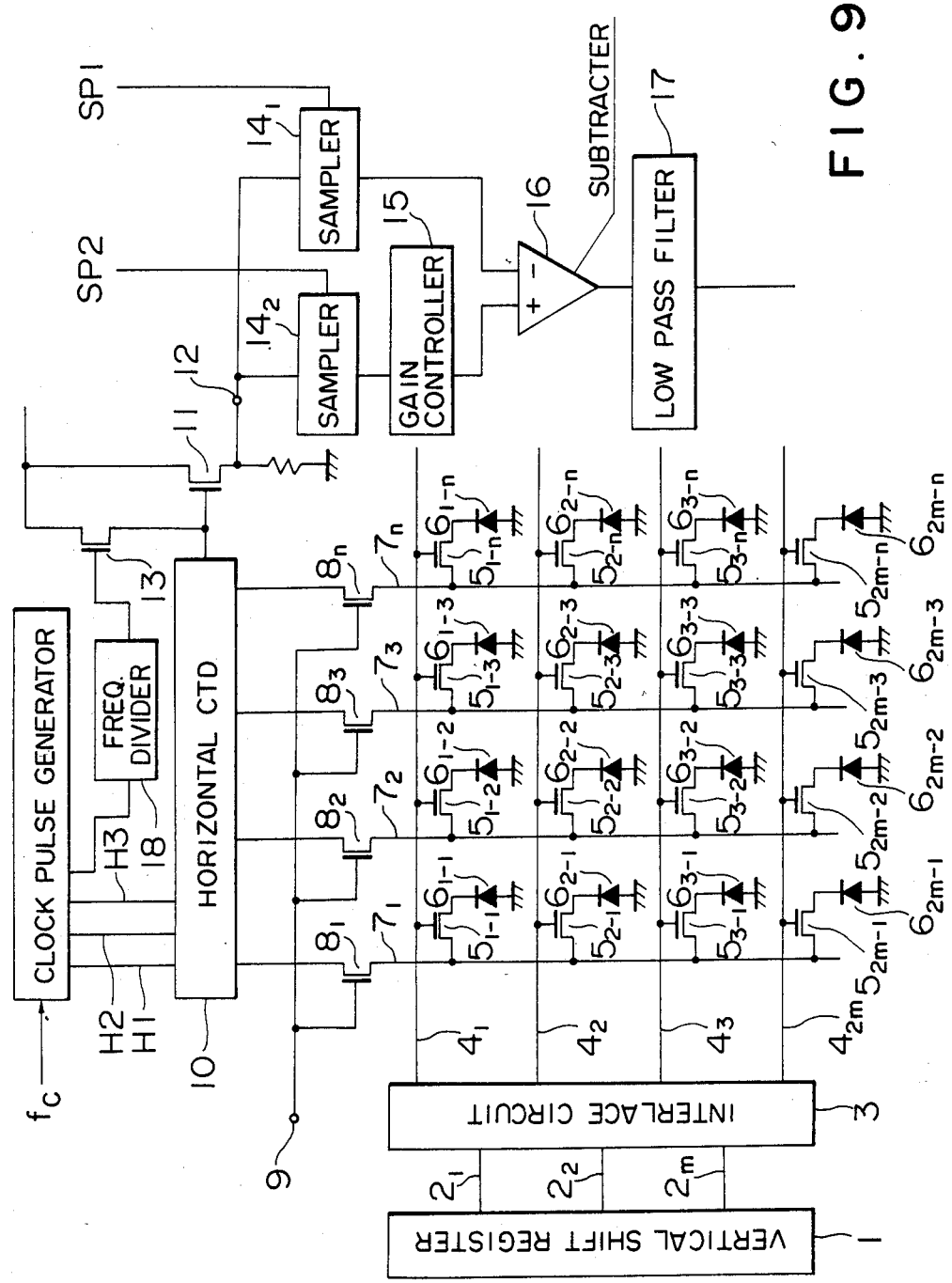
FIG. 9 is a schematic diagram showing another embodiment of a solid state imaging device according to the present invention.

FIG. 9 shows the circuit configuration of another embodiment of a solid state imaging device according to the present invention. The embodiment of FIG. 9 is different from the embodiment of FIG. 7, in that the output of the sampling circuit $14_2$ is applied to the gain control circuit 15. The output voltage $V_2''$ from the sampling circuit $14_2$ is attenuated by the gain control circuit 15 to the product of a factor $T_1/(T_1+T_2)$ and the voltage $V_2''$. Thus, an output voltage $V_{out}''$ from the subtracter 16 is given by the following equation:

$$V_{out}'' = \frac{T_1}{T_1 + T_2} \cdot \frac{Q_S}{C_G} - \frac{T_2}{T_1 + T_2} \cdot \frac{Q_{n1}}{C_G} \quad (12)$$

$$= \frac{T_1}{T_1 + T_2} \cdot \frac{1}{C_G} \cdot \left( Q_S - \frac{T_2}{T_1} \cdot Q_{n1} \right)$$

As is evident from the comparison between the equations (12) and (11), the embodiment of FIG. 9 can produce the same effect as the embodiment of FIG. 7.

Figure 10:
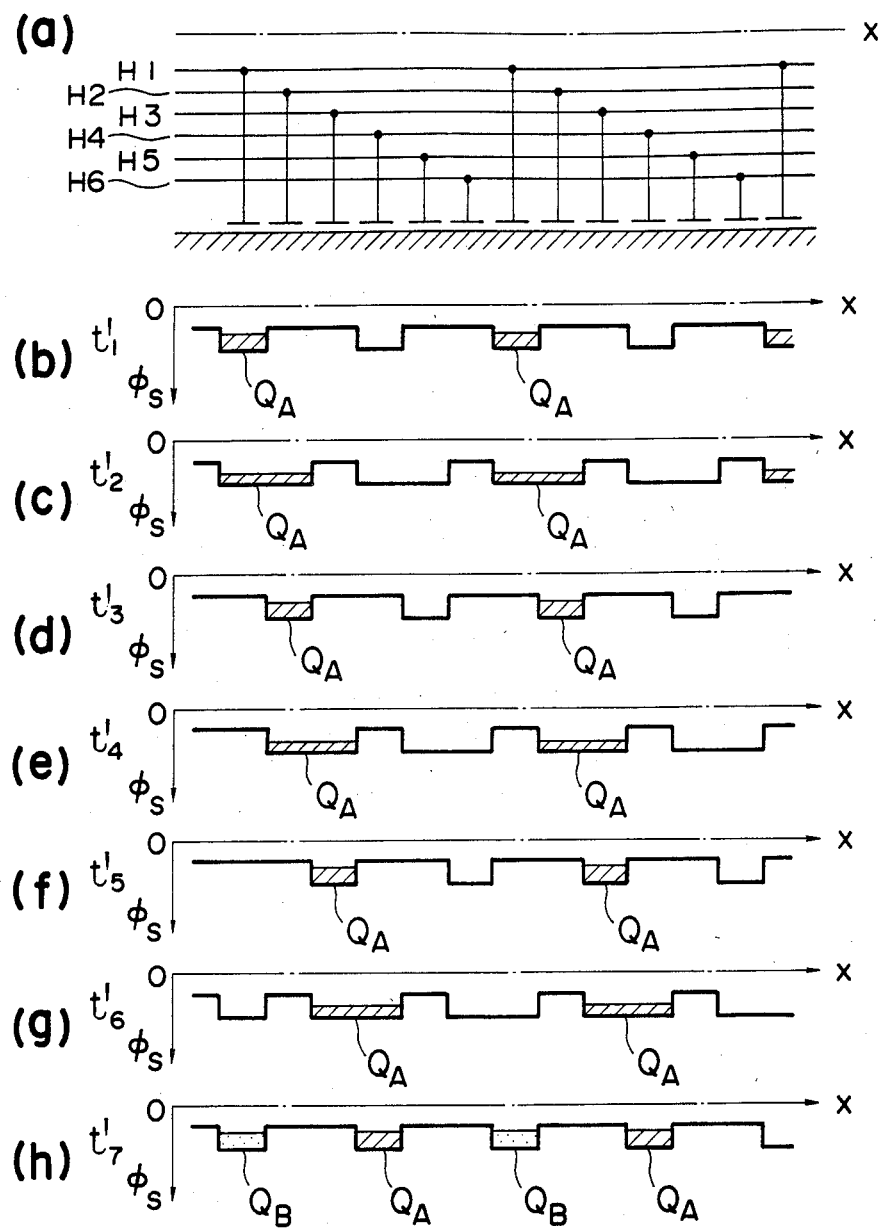
FIG. 10 shows the electrode structure of a CTD which is included in a further embodiment of a solid state imaging device according to the present invention, and the change of the internal potential distribution in the CTD.
Figure 10:
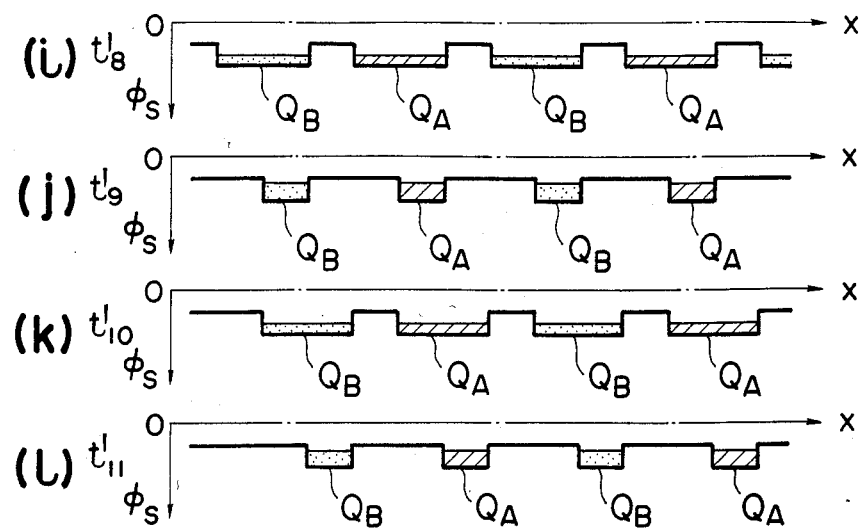
Figure 11:
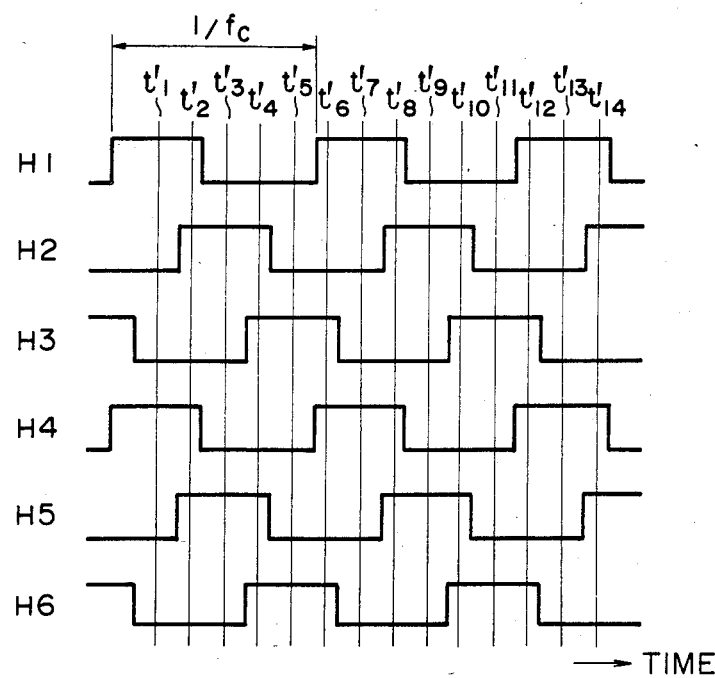
FIG. 11 is a time chart showing the driving pulse signals applied to the electrodes of FIG. 10.

FIG. 10 shows the electrode structure of a horizontal CTD which is included in a further embodiment of a solid state imaging device according to the present invention, and the change of the internal potential distribution in the horizontal CTD. In FIG. 10, the abscissa indicates a distance x. In parts (b) through (l) of FIG. 10, the ordinate indicates an internal potential $\phi_s$. Further, FIG. 11 is a time chart showing pulse signals applied to the electrodes of FIG. 10.

Figure 3:
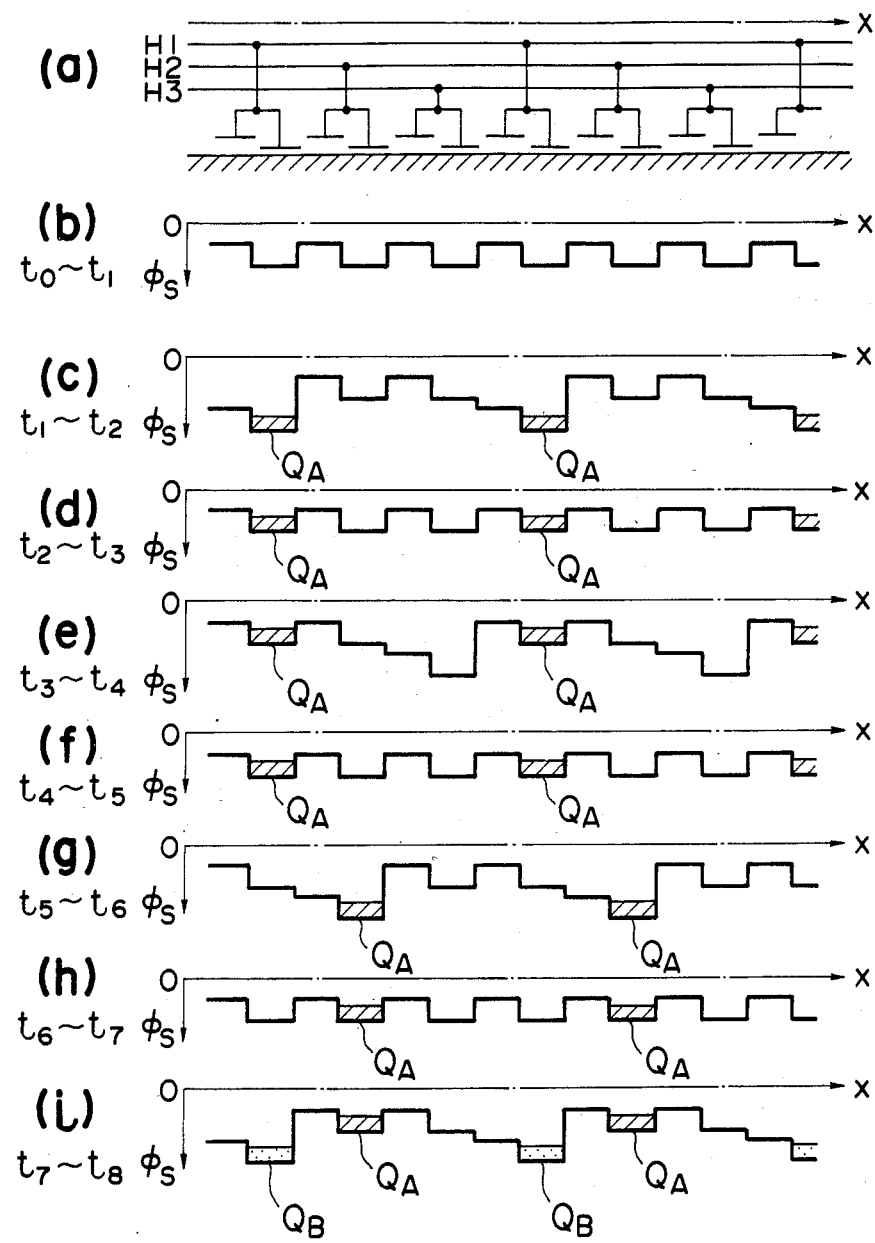
FIG. 3 shows the electrode structure of the CTD shown in FIG. 1, and the change of internal potential distribution in the CTD.
Figure 3:
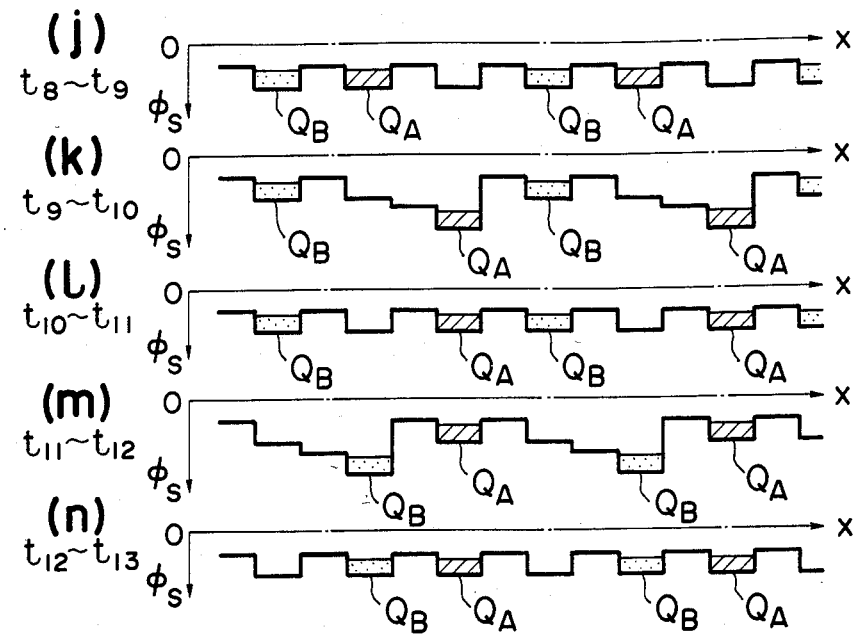
Figure 4:
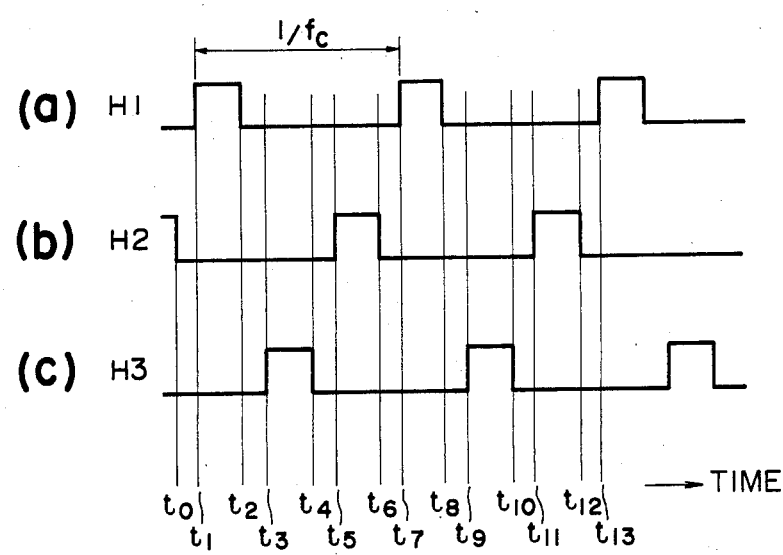
FIG. 4 is a time chart showing the driving pulse signals applied to the electrodes of FIG. 3.
Figure 5:
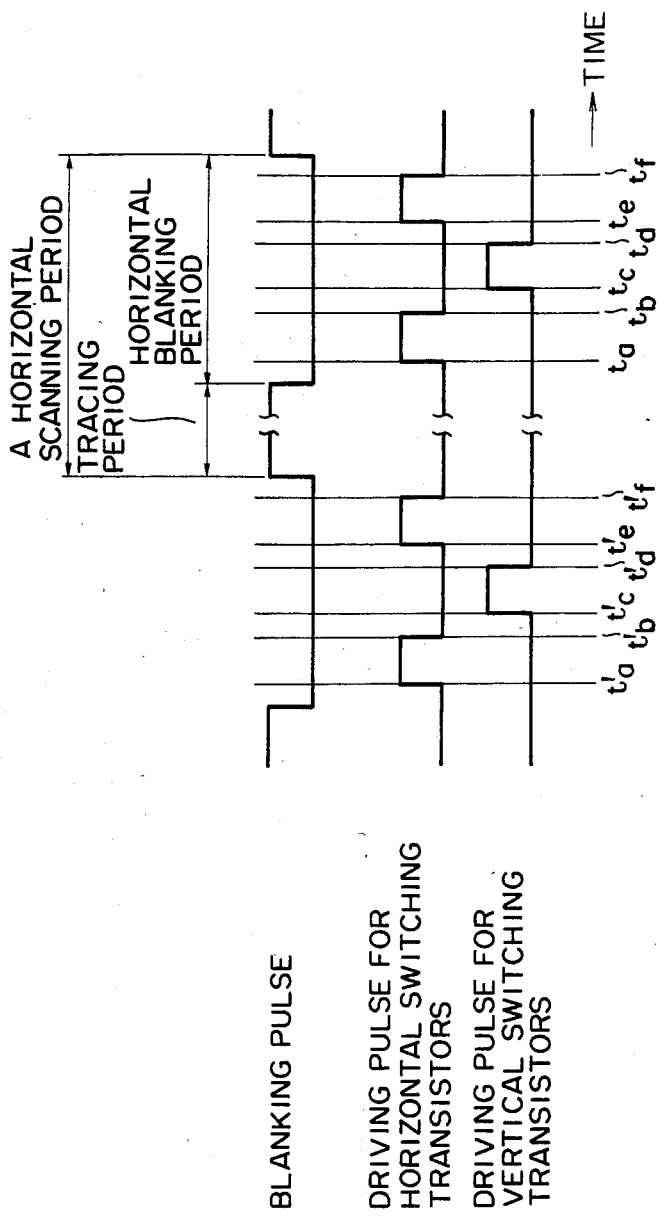
FIG. 5 is a time chart for explaining the charge transfer operation in the imaging device of FIG. 1.

The 3-phase electrode structure shown in part (a) of FIG. 3 is used in the horizontal CTD of each of the embodiments shown in FIGS. 7 and 9. However, a 6-phase electrode structure is used in the present embodiment, and can produce the same effect as the 3-phase electrode structure in the embodiments of FIGS. 7 and 9. That is, when six pulse signals which have a frequency $f_c$ and are different in phase from each other as shown in FIG. 11, are applied to six electrode groups $H_1$, $H_2$, $H_3$, $H_4$, $H_5$ and $H_6$, two charges $Q_A$ and $Q_B$ are separated from each other and separately transferred through the horizontal CTD 10, by the action of a plurality of sets of adjacent six electrodes $H_1$ to $H_6$, as shown in parts (b) through (l) of FIG. 10. In more detail, at a time $t_1'$, a pulse is applied to the electrode group $H_1$ as shown in FIG. 11, and horizontal switching transistors 8 corresponding to the electrode group $H_1$ are turned on. Thus, the charge $Q_A$ is introduced into the horizontal CTD 10. At a time $t_2'$, pulses are applied to the electrode groups $H_1$ and $H_2$, as shown in FIG. 11. Further, at a time $t_3'$, the electrode group $H_1$ is not applied with any pulse but the electrode groups $H_2$ is applied with a pulse, as shown in FIG. 11. Thus, the charge $Q_A$ is transferred through the state shown in part (c) of FIG. 10 to a potential well beneath the electrode group $H_2$, as shown in part (d) of FIG. 3. The charge $Q_A$ is further transferred in a similar manner, and can be placed in a potential well beneath the electrode group $H_4$ at a time $t_7'$, as shown in part (h) of FIG. 10. At this time, the electrode group $H_1$ is applied with a pulse, as shown in FIG. 11, and therefore the next charge $Q_B$ is introduced into the horizontal CTD 10 by turning on the horizontal switching transistors 8 corresponding to the electrode group $H_1$. At a time $t_{11}'$, the first charge $Q_A$ is transferred to a potential well beneath the electrode group $H_6$ and the second charge $Q_B$ is transferred to a potential well beneath the electrode group $H_3$, as shown in part (l) of FIG. 10. The charges $Q_A$ and $Q_B$ are then delivered from the horizontal CTD 10, and processed in the same manner as in the embodiment of FIG. 7 or 9.

Next, explanation will be made of a still another embodiment of a solid state imaging device according to the present invention, in which a CTD having a 6-phase electrode structure such as shown in part (a) of FIG. 10 is used for forming a two-dimensional CTD.

In the above-mentioned embodiments, an MOS type diode array is combined with a one-dimensional CTD, that is, an imaging element of interline transfer CTD type is used. However, when the vertical CTD of a two-dimensional CTD (that is, a frame transfer CTD in which the horizontal signal transmission and the vertical signal transmission are both performed by a CTD) is formed of a CTD having the above-mentioned 6-phase electrode structure, the first vertical smear charge and the signal charge combined with the second vertical smear charge can be separately transferred to the horizontal CTD. These charges can be processed in the same manner as in the embodiment of FIG. 7 or 9.

When the accumulation time of the first vertical smear charge in the vertical CTD and that of the second vertical smear charge (which is combined with the signal charge) are expressed by $T_1$ and $T_2$ respectively, the previously-mentioned equation (11) also holds in this case. Accordingly, the present embodiment can produce the same effect as the embodiments shown in FIGS. 7, 9 and 10.

We claim:
1. A solid state imaging device comprising:
a plurality of photoelectric conversion elements arranged regularly in horizontal and vertical directions;
a plurality of vertical signal lines for transferring charges in a vertical direction;
a first group of switches for transferring signal charges which are generated in said photoelectric conversion elements in response to incident light, to predetermined ones of said vertical signal lines;
horizontal transfer means including at least one charge transfer device, said charge transfer device being provided with a set of transfer electrodes capable of transferring two kinds of charges, separately from each other, in a horizontal direction;
a second group of switches for transferring charges on said vertical signal lines from said vertical signal lines to said horizontal transfer means;
pulse generating means for said first group of switches and pulse generating means for said second group of switches, for generating a pulse for controlling said first group switches and a pulse for controlling said second group switches, respectively, so that both smear charges stored on said vertical signal lines and signal charges transferred from said photoelectric conversion elements through said first group switches to said vertical signal lines may be transferred, separately from each other, to said horizontal transfer means;

transfer-pulse generating means for generating a transfer control pulse, said transfer control pulse being applied to said transfer electrodes, to transfer the smear charges and the signal charges, both of which have been transferred to said horizontal transfer means, to an output end separately from each other;

charge-voltage conversion means for converting each smear charge and each signal charge, both of which have been transferred by said horizontal transfer means, into a smear voltage and a signal voltage, respectively;

reset means for resetting the smear charge and the signal charge held by said charge-voltage conversion means, at an interval twice as long as the repetition period of said transfer control pulse; and subtraction means for producing a difference between said smear charge and said signal charge after at least one of said smear charge and said signal charge has been adjusted in accordance with a predetermined factor.

2. A solid state imaging device according to claim 1, wherein a frequency divider is used for making the reset interval twice as long as the repetition period of said transfer control pulse.

3. A solid state imaging device according to claim 1, wherein said subtraction means adjusts at least one of said smear voltage and said signal voltage, in accordance with the accumulation time of a smear charge transferred to said horizontal transfer means and the accumulation time of a smear charge which is combined with a signal charge transferred to said horizontal transfer means, so that said difference contains no smear component.

4. A solid state imaging device according to claim 1, wherein said horizontal transfer means includes one charge transfer device having a plurality of stages each composed of three 3-phase driven storage regions, and wherein said charge transfer device transfers said smear charges and said signal charges separately from each other, by storing a smear charge and a signal charge separately from each other in two of said three storage regions of each of said stages.

5. A solid state imaging device according to claim 1, wherein said horizontal transfer means includes one charge transfer device having a plurality of stages each composed of six 6-phase driven storage regions, and wherein said charge transfer device transfers said smear charges and said signal charges separately from each other.

* * * * *